US011042282B2

(12) United States Patent
Dandoko

(10) Patent No.: US 11,042,282 B2
(45) Date of Patent: Jun. 22, 2021

(54) INFORMATION PROCESSOR FOR CHANGING SCROLL AMOUNT UPON RECEIVING TOUCH OPERATION PERFORMED ON RETURN KEY OR FORWARD KEY

(71) Applicant: KYOCERA Document Solutions Inc., Osaka (JP)

(72) Inventor: Takushi Dandoko, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/896,149

(22) Filed: Jun. 8, 2020

(65) Prior Publication Data
US 2020/0401287 A1 Dec. 24, 2020

(30) Foreign Application Priority Data
Jun. 18, 2019 (JP) .............................. JP2019-112999

(51) Int. Cl.
*G06F 3/0485* (2013.01)
*G06F 3/0488* (2013.01)

(52) U.S. Cl.
CPC .......... *G06F 3/0485* (2013.01); *G06F 3/0488* (2013.01)

(58) Field of Classification Search
CPC .............................. G06F 3/0485; G06F 3/0488
See application file for complete search history.

(56) References Cited

U.S. PATENT DOCUMENTS

| 9,081,496 | B2* | 7/2015 | Cho | G06F 3/04883 |
| 10,891,044 | B1* | 1/2021 | Corsin | G06F 3/04883 |
| 2003/0007464 | A1* | 1/2003 | Balani | H04W 4/021 |
| | | | | 370/310 |
| 2003/0122787 | A1* | 7/2003 | Zimmerman | G06F 3/0485 |
| | | | | 345/173 |
| 2008/0062207 | A1* | 3/2008 | Park | G06F 3/0485 |
| | | | | 345/684 |
| 2009/0222423 | A1* | 9/2009 | Haruta | G06F 3/0485 |
| 2010/0269038 | A1* | 10/2010 | Tsuda | G06F 3/0485 |
| | | | | 715/702 |

(Continued)

FOREIGN PATENT DOCUMENTS

JP 2013-114559 A 6/2013

*Primary Examiner* — Ryan F Pitaro
(74) *Attorney, Agent, or Firm* — IP Business Solutions, LLC

(57) ABSTRACT

An information processor includes a display device, a touch panel, a storage device, and a control device. The control device causes the display device to display a portion of a predefined image, a forward key, and a return key, upon receiving slide operation on a display portion via the touch panel, causes the display device to scroll the predefined image until a movement amount of the predefined image reaches a scroll amount and causes the storage device to store the set scroll amount as an additional scroll amount, and upon receiving touch operation performed on the forward key via the touch panel before the movement amount of the predefined image reaches the set scroll amount, adds the additional scroll amount to the set scroll amount to change the set scroll amount and causes the display device to scroll the image until the movement amount of the predefined image reaches the scroll amount having been changed.

6 Claims, 11 Drawing Sheets

(56) References Cited

U.S. PATENT DOCUMENTS

| | | | |
|---|---|---|---|
| 2011/0061025 A1* | 3/2011 | Walline | G06F 3/0485 715/830 |
| 2011/0154236 A1* | 6/2011 | Stoeck | G06F 11/3604 715/771 |
| 2011/0154263 A1* | 6/2011 | Roulliere | G06F 3/0482 715/830 |
| 2012/0098769 A1* | 4/2012 | Nagasaka | G06F 3/0485 345/173 |
| 2012/0167002 A1* | 6/2012 | Torigoe | G06F 3/0488 715/784 |
| 2013/0100051 A1* | 4/2013 | Mochizuki | G06F 3/04842 345/173 |
| 2013/0120262 A1* | 5/2013 | Piot | G06F 3/048 345/163 |
| 2013/0139100 A1 | 5/2013 | Horiike | |
| 2013/0227464 A1* | 8/2013 | Jin | G06F 3/04886 715/784 |
| 2013/0227588 A1* | 8/2013 | Bakaleinik | G06F 9/542 719/318 |
| 2014/0055395 A1* | 2/2014 | Kim | G06F 3/0488 345/173 |
| 2014/0235297 A1* | 8/2014 | Itamoto | G06F 21/31 455/566 |
| 2014/0250390 A1* | 9/2014 | Holmes | G06F 3/0482 715/760 |
| 2015/0109229 A1* | 4/2015 | Nishigaki | G06F 3/04883 345/173 |
| 2015/0169151 A1* | 6/2015 | Urakawa | G06F 3/041 715/776 |
| 2015/0234572 A1* | 8/2015 | Arita | G06F 3/04817 715/846 |
| 2015/0378550 A1* | 12/2015 | Miyazaki | G06F 3/04886 715/784 |
| 2016/0103506 A1* | 4/2016 | Matsuzaki | G06F 3/04883 345/156 |
| 2018/0034495 A1* | 2/2018 | Kim | A45C 13/00 |

\* cited by examiner

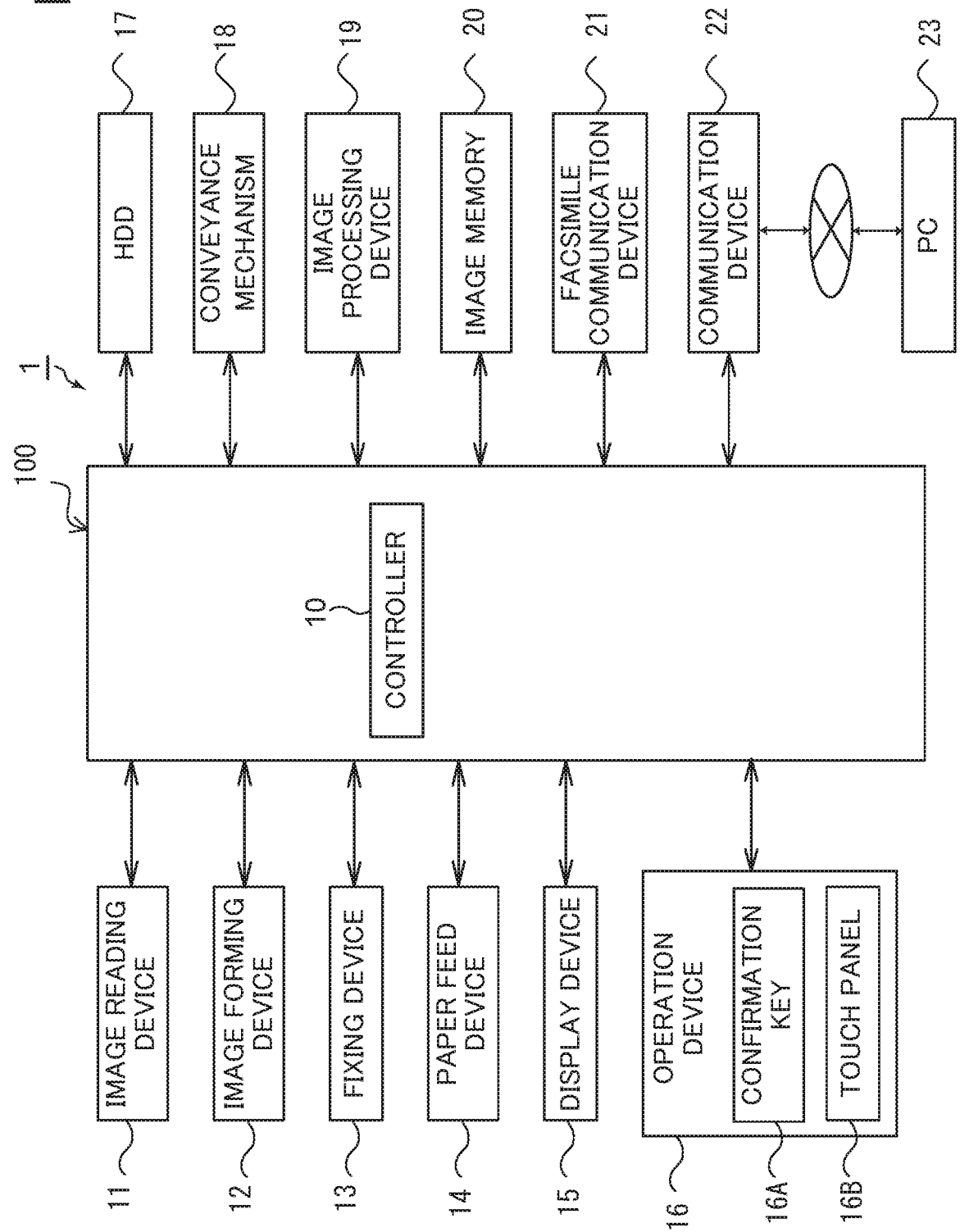

Fig.4

| | | | | | |
|---|---|---|---|---|---|
| 03/16 21:35 | PRINT | DOC010007 | AAAA | OK | NORMALLY ENDED | 41A
| 03/16 21:34 | COPY | DOC010005 | BBBB | OK | NORMALLY ENDED | 41B
| 03/16 21:33 | PRINT | DOC010003 | CCCC | ⊘ | CANCELLED | 41C
| 03/16 21:16 | PRINT | DOC010001 | DDDD | OK | NORMALLY ENDED | 41D
| 03/16 21:10 | PRINT | DOC010000 | EEEE | OK | NORMALLY ENDED | 41E
| 03/16 21:04 | COPY | DOC009998 | FFFF | OK | NORMALLY ENDED | 41F
| 03/16 20:53 | COPY | DOC009996 | CCCC | OK | NORMALLY ENDED | 41G
| 03/16 20:45 | PRINT | DOC009995 | GGGG | ⊘ | CANCELLED | 41H
| 03/16 20:35 | PRINT | DOC009994 | AAAA | OK | NORMALLY ENDED | 41I
| 03/16 20:24 | COPY | DOC009992 | HHHH | OK | NORMALLY ENDED | 41J
| 03/16 20:13 | PRINT | DOC009990 | CCCC | OK | NORMALLY ENDED | 41K
| 03/16 20:05 | PRINT | DOC009989 | AAAA | OK | NORMALLY ENDED | 41L
| 03/16 19:13 | PRINT | DOC009986 | IIII | OK | NORMALLY ENDED | 41M
| 03/16 19:05 | PRINT | DOC009984 | JJJJ | OK | NORMALLY ENDED | 41N

INFORMATION PROCESSOR FOR CHANGING SCROLL AMOUNT UPON RECEIVING TOUCH OPERATION PERFORMED ON RETURN KEY OR FORWARD KEY

INCORPORATION BY REFERENCE

This application claims priority to Japanese Patent Application No. 2019-112999 filed on 18 Jun. 2019, the entire contents of which are incorporated by reference herein.

BACKGROUND

This disclosure relates to an information processor and more specifically to a technology for scrolling an image.

A plurality of operation methods for scrolling an image displayed on a touch panel display are known. For example, known is a technology of scrolling an image displayed on a touch panel display upon receiving flick operation or swipe operation performed on the image displayed on the touch panel display, swipe operation performed on a scroll bar, or touch operation performed on a return key indicating an up arrow or a forward key indicating a down arrow.

SUMMARY

As one aspect of this disclosure, a technology obtained by further improving the technology described above will be suggested.

An information processor according to one aspect of this disclosure includes a display device, a touch panel, a storage device, and a control device. The control device includes a processor, and as a result of execution of a control program by the processor, functions as a controller. The controller causes the display device to display, in a predefined region, a portion in a predefined direction of a predefined image as a display portion and also to display: a forward key configured to input an instruction for displaying, in the predefined region, a forward image portion being located on a side of a first direction directed more closely to one end side of the predefined direction than the display portion and continuing to the display portion in the predefined image; and a return key configured to input an instruction for displaying, in the predefined region, a return image portion being located on a side of a second direction directed more closely to another end side of the predefined direction than the display portion and continuing to the display portion in the predefined image. Upon receiving slide operation performed on the display portion via the touch panel, the controller causes the display device to scroll the predefined image in the predefined direction toward a direction of the slide operation until a movement amount of the predefined image from a time point at which the slide operation was received reaches a scroll amount set in accordance with an attribute of the slide operation and also causes the storage device to store the set scroll amount as an additional scroll amount. Upon receiving touch operation performed on the forward key via the touch panel before the movement amount of the predefined image from the time point at which the slide operation was received reaches the set scroll amount, the controller adds the additional scroll amount to the set scroll amount to change the set scroll amount and causes the display device to scroll the predefined image in the predefined direction toward the first direction until the movement amount of the image from the time point at which the slide operation was received reaches the scroll amount having been changed.

BRIEF DESCRIPTION OF THE DRAWINGS

FIG. 1 is a block diagram illustrating inner configuration of an image forming apparatus.

FIG. 4 is a diagram illustrating one example of a list image.

FIG. 8 is a diagram illustrating another example of the confirmation screen provided at the time point at which the scroll ends.

FIG. 10 is a diagram illustrating another example of the confirmation screen provided at the time point at which the scroll ends.

DETAILED DESCRIPTION

Figure 2A:
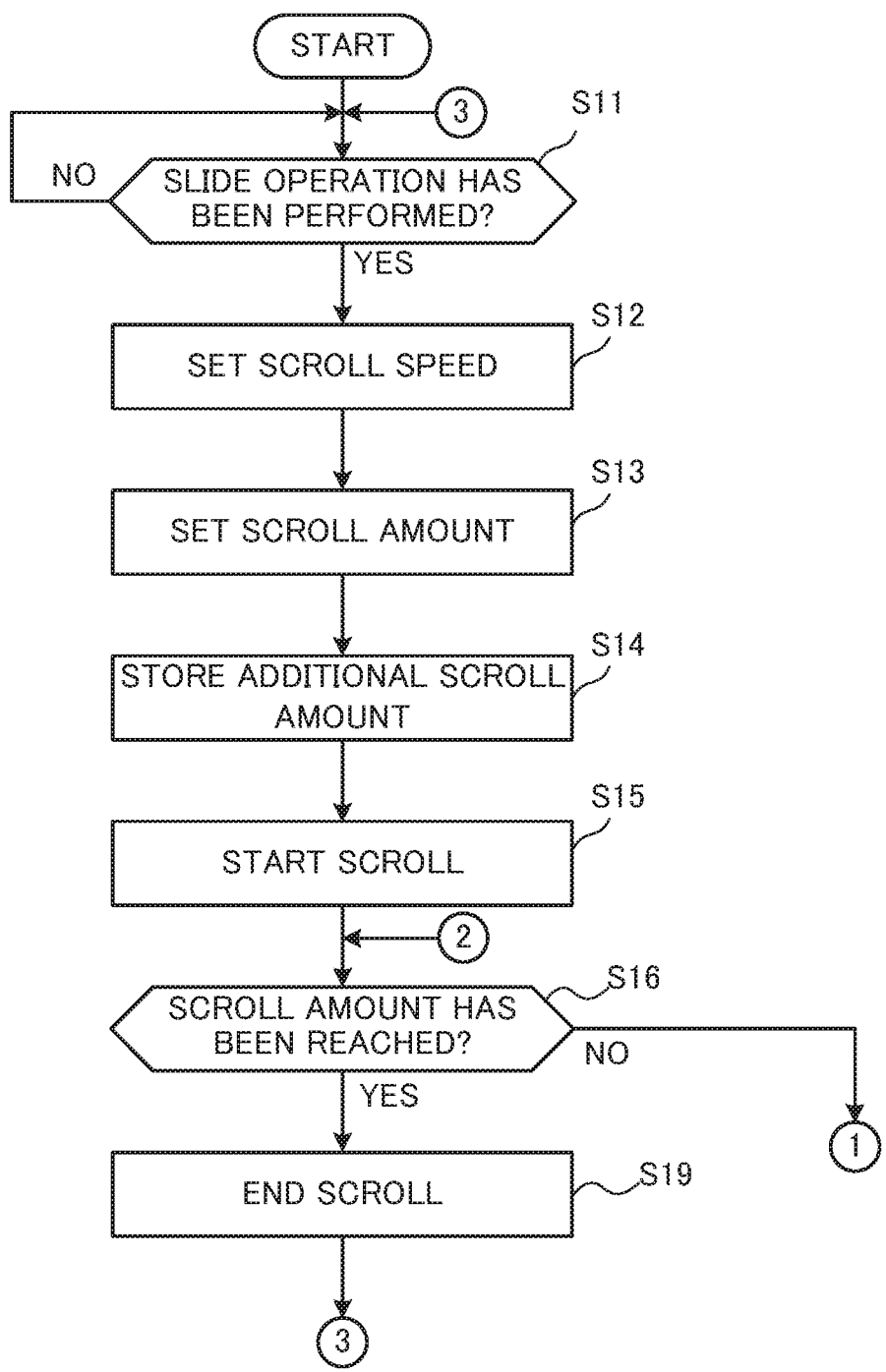
FIG. 2A is a flowchart illustrating display portion change processing.

Hereinafter, an image forming apparatus as an information processor according to one embodiment of this disclosure will be described with reference to the drawings. FIG. 1 is a block diagram illustrating inner configuration of the image forming apparatus. With reference to FIG. 1, the image forming apparatus 1 is a color multifunction peripheral including a plurality of functions such as a facsimile function, a copy function, a printer function, and a scanner function.

The image forming apparatus 1 includes a control device 100. The control device 100 includes a processor, a random access memory (RAM), a read only memory (ROM), etc. The processor is, for example, a central processing unit (CPU), a micro processing unit (MPU), or an application specific integrated circuit (ASIC).

The control device 100 functions as a controller 10 as a result of execution of a control programs stored in the ROM or a hard disc drive (HDD) 17 by the processor. Note that the controller 10 may be formed by a hard circuit without depending on operation performed based on the control programs.

The controller 10 is in charge of overall control of the image forming apparatus 1. For example, upon receiving, via a touch panel 16B, flick operation or swipe operation performed on an image displayed in a predefined region in a display device 15, the controller 10 carries out inertia scrolling of the image displayed in the aforementioned region. Upon receiving touch operation performed on a forward key or a return key displayed at the display device 15 via the touch panel 16B when not carrying out the inertia scrolling of the image displayed in the aforementioned region, the controller 10 causes a forward image portion or a return image portion of the aforementioned image, to be described later on, to be displayed in the aforementioned region.

The control device 100 is electrically connected to an image reading device 11, an image forming device 12, a fixing device 13, a paper feed device 14, the display device 15, an operation device 16, the HDD 17, a conveyance mechanism 18, an image processing device 19, an image memory 20, a facsimile communication device 21, a communication device 22, etc.

The image reading device 11 is an auto document feeder (ADF) including: a document conveyance device which conveys a document loaded on a document base; and a scanner which optically reads the document conveyed by the document conveyance device or a document loaded on platen glass. The image reading device 11 irradiates the document with light by a light irradiation device and receives light reflected on the document by a charge-coupled device (CCD) sensor to thereby read the document and generate image data.

The image forming device 12 includes a photoconductive drum, a charging device, an exposure device, a developing device, and a transfer device. Based on, for example, the image data generated by the image reading device 11, the image forming device 12 forms, on recording paper conveyed from the paper feed device 14, an image formed of a toner image.

The fixing device 13 heats and pressurizes the recording paper, on which the toner image has been formed by the image forming device 12, to thereby fix the toner image on the recording paper. The recording paper on which the toner image has been fixed by the fixing device 13 is discharged onto a discharge tray.

The paper feed device 14 includes a manual feed tray and a paper feed cassette. The paper feed device 14 individually draws pieces of recording paper stored in the paper feed cassette or pieces of recording paper loaded on the manual feed tray and feeds the recording paper toward the image forming device 12.

The display device 15 is formed of, for example, a liquid crystal display. The display device 15 displays various screens related to various functions executable by the image forming apparatus 1.

The operation device 16 includes a plurality of hard keys such as a confirmation key 16A for inputting an instruction for confirming a job status or history. The operation device 16 also includes the touch panel 16B arranged on the display device 15 in a manner such as to be superposed on the display device 15. A user inputs, via the operation device 16, various pieces of information such as instructions for executing the various functions executable by the image forming apparatus 1.

Upon flick operation or swipe operation performed on the image displayed at the display device 15 by the user, the touch panel 16B detects a first position at which a finger of the user makes first contact with the screen of the display device 15 and a second position at which the finger of the user separates from the screen of the display device 15.

The HDD 17 is a large-capacity storage device for storing various pieces of data such as the image data generated by the image reading device 11. The HDD 17 stores various control programs for realizing general operation of the image forming apparatus 1. The HDD 17 stores, as one of the various control programs, a change program for executing display portion change processing according to one embodiment of this disclosure. The HDD 17 is one example of a storage device in What is claimed is.

The conveyance mechanism 18 is composed of a conveyance roller pair, a discharge roller pair, etc. The conveyance mechanism 18 conveys the recording paper along a conveyance path toward the discharge tray set as a discharge destination.

The image processing device 19 executes image processing on the image data generated by the image reading device 11 when necessary.

The image memory 20 includes a region where the image data, which has been generated by the image reading device 11 and which is to be outputted, is temporarily stored.

The facsimile communication device 21 connects to a public line and performs image data transmission and reception via the public line.

The communication device 22 includes a communication module such as a local area network (LAN) board. The image forming apparatus 1 performs data communication, via the communication device 22, with, for example, a personal computer (PC) 23 connected via the network.

Each part of the image forming apparatus 1 is electrically connected to a power source, from which power is supplied to thereby operate each part of the image forming apparatus 1.

Operation

Figure 2B:
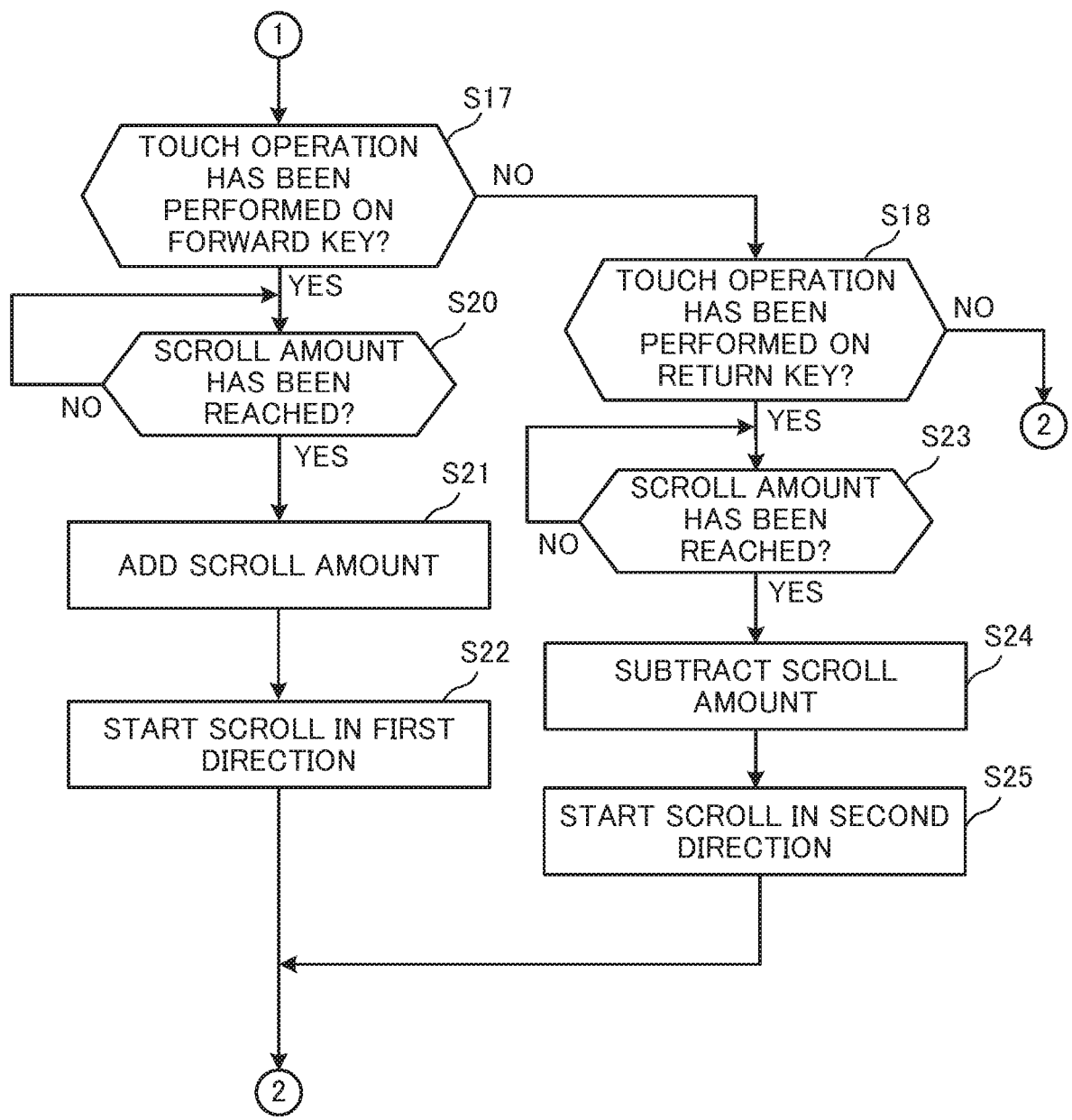
FIG. 2B is a flowchart illustrating the display portion change processing.
Figure 3:
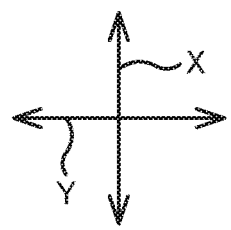
FIG. 3 is a diagram illustrating one example of a confirmation screen.

FIGS. 2A and 2B are flowcharts illustrating the display portion change processing. FIG. 3 is a diagram illustrating one example of a confirmation screen. FIG. 4 is a diagram illustrating one example of a list image displayed on the confirmation screen. Hereinafter, the operation of the image forming apparatus 1 performed upon execution of the display portion change processing will be described with reference to FIGS. 2A to 4.

Hereinafter, it is assumed that power is being introduced to the image forming apparatus 1. It is also assumed that the user has pressed the confirmation key 16A included in the operation device 16. Referring to FIG. 3, upon detecting the pressing of the confirmation key 16A, the controller 10 causes the display device 15 to display a confirmation screen 30 for confirming the job status or history.

It is assumed that a user whose user name is "AAAA" has touched a tab 31 as a graphical user interface (GUI) for selecting a print job and has touched a tab 32 as a GUI for selecting a job history in order to confirm his or her own print job history. Upon receiving the touch operation performed on the tab 31 and the tab 32 via the touch panel 16B, the controller 10 causes the display device 15 to display a portion 42 as illustrated in FIG. 4 in a region 33 predefined as a display portion: the portion 42 is one portion in a shorter direction X of the confirmation screen 30 (being as a predefined direction) of the list image 40 indicating the print job history.

Referring to FIG. 4, the list image 40 includes a plurality of items 41A to 41N arrayed in the shorter direction X of the confirmation screen 30. The items 41A to 41N each include character strings respectively indicating: job ending date and time; a job type; a job name; a user name; and a job execution result.

For example, the item 41A includes: the character string "21:35 on March 16" indicating the ending date and time; the character string "Print" indicating the job type; the character string "DOC010007" indicating the job name; the character string "AAAA" indicating the user name; and the character string "Normally ended", as the job execution result, indicating that the job has ended normally.

The controller 10 cannot display the entire list image 40 in the region 33 at once. Therefore, the controller 10 causes the display device 15 to display, in the region 33 serving as the display portion, only the portion 42 which is included in the entire list image 40 and which is displayable in the region 33. In this case, the portion 42 includes the four items 41A to 41D.

The controller 10 causes the display device 15 to display a forward key 34 at one end part of the region 33 in a longer direction Y of the confirmation screen 30 and at one end part of the region 33 in the shorter direction X of the confirmation screen 30. The controller 10 also causes the display device 15 to display the return key 35 at one end part of the region 33 in the longer direction Y of the confirmation screen 30 and at another end part of the region 33 in the shorter direction X of the confirmation screen 30. It is assumed that the controller 10 causes the display device 15 to display the forward key 34 and the return key 35 in "blue" as a predefined first display color.

The forward key 34 is a soft key for inputting an instruction for displaying, in the region 33, the forward image portion, the forward image portion being located on a side of a first direction directed more closely to one end side of the shorter direction X than the display portion and continuing to the display portion in the list image 40. The return key 35 is a soft key for inputting an instruction for displaying, in the region 33, the return image portion, the return image portion being located on a side of a second direction directed more closely to another end side of the shorter direction X than the display portion and continuing to the display portion in the list image 40.

For example, upon receiving touch operation performed on the forward key 34 via the touch panel 16B when causing the display device 15 to display, in the region 33, the display portion including the four items 41E to 41H, the controller 10 causes the display device 15 to display, in the region 33, a forward image portion including the four items 41I to 41L.

For example, upon receiving touch operation performed on the return key 35 via the touch panel 16B when causing the display device 15 to display, in the region 33, the display portion including the four items 41E to 41H, the controller 10 causes the display device 15 to display, in the region 33, a return image portion including the four items 41A to 41D.

Referring to FIG. 2A, the controller 10 starts execution of the display portion change processing upon causing the display device 15 to display the confirmation screen 30. The controller 10 stands by until slide operation performed on the display portion of the list image 40 is received in the display portion change processing (NO in step S11). Here, the slide operation indicates flick operation or swipe operation.

Figure 5:
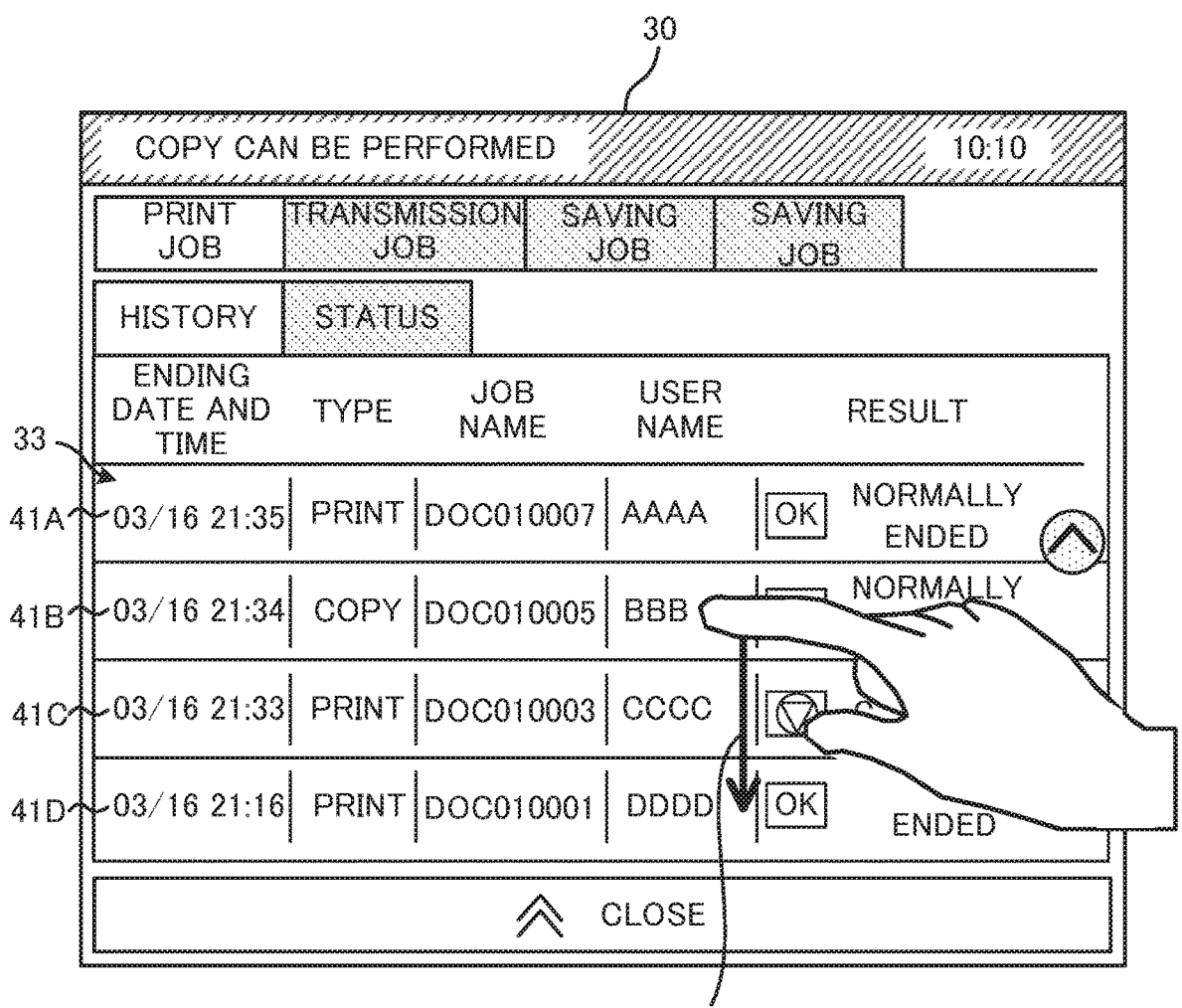
FIG. 5 is a diagram illustrating one example of the confirmation screen provided when slide operation is performed.

FIG. 5 is a diagram illustrating one example of the confirmation screen provided when the slide operation is performed. Referring FIG. 5, it is assumed that the controller 10 causes the display device 15 to display, in the region 33, the portion 42 including the items 41A to 41D as the display portion. It is also assumed that the user has performed flick operation A1 directed in the first direction on the portion 42 displayed in the region 33 for the purpose of displaying the item 41I in the region 33.

Upon receiving the flick operation A1 via the touch panel 16B, the controller 10 determines that the slide operation has been received (YES in step S11), and sets speed of scrolling the list image 40 in accordance with an attribute of the received slide operation (step S12). The attribute of the slide operation described above is not specifically limited, but is, for example, a distance of the slide operation or speed of the slide operation.

A method of setting the scroll speed is not specifically limited as long as the method is a generally-known method. For example, the controller 10 first acquires the speed of the slide operation by dividing a distance from the first position to the second position of the slide operation by time required for the finger of the user to move from the first position to the second position. Next, the controller 10 sets, as the scroll speed, a value acquired by multiplying the acquired speed of the slide operation by a predefined first coefficient.

After setting the scroll speed, the controller 10 sets an amount of movement of the list image 40 as a result of the scroll (hereinafter referred to as "scroll amount") in accordance with the received attribute of the slide operation (step S13). The method of setting the scroll amount is not specifically limited as long as the method is a generally-known method. For example, the controller 10 sets, as the scroll amount of the list image 40, a value acquired by multiplying the distance from the first position to the second position of the slide operation by a predefined second coefficient. In this case, the controller 10 sets, as the scroll amount, a value corresponding to "an amount of movement for the five items".

After setting the scroll amount, the controller 10 causes the HDD 17 to store the set scroll amount as an additional scroll amount (step S14). After storing the additional scroll amount, the controller 10 causes the display device 15 to start inertia scrolling of the list image 40 in the shorter direction X directed toward the first direction at the set scroll speed (step S15). After starting the scroll, the controller 10 determines whether or not the amount of movement of the list image 40 from a time point at which the slide operation was received has reached the set scroll amount (step S16).
(1) When the movement amount of the list image 40 has reached the set scroll amount while the touch operation performed on the forward key 34 or the return key 35 has not been received It is assumed that the user has performed neither the touch operation on the forward key 34 nor the touch operation on the return key 35 during the scroll of the list image 40.

Referring to FIG. 2B, until determination that the movement amount of the list image 40 has reached the set scroll amount in this case, the controller 10 repeats: processing of determining that the movement amount of the list image 40 has not reached the set scroll amount (NO in step S16); processing of determining that the touch operation performed on the forward key 34 has not been received (NO in step S17); and processing of determining that the touch operation performed on the return key 35 has not been received (NO in step S18).

Upon causing the display device 15 to scroll the list image 40 until the display portion including the items 41F to 41I is displayed in the region 33, the controller 10 determines that the movement amount of the list image 40 has reached the set scroll amount (YES in step S16) and ends the scroll of the list image 40 (step S19). After ending of the scroll, the controller 10 returns to the processing in step S11.

Figure 6:
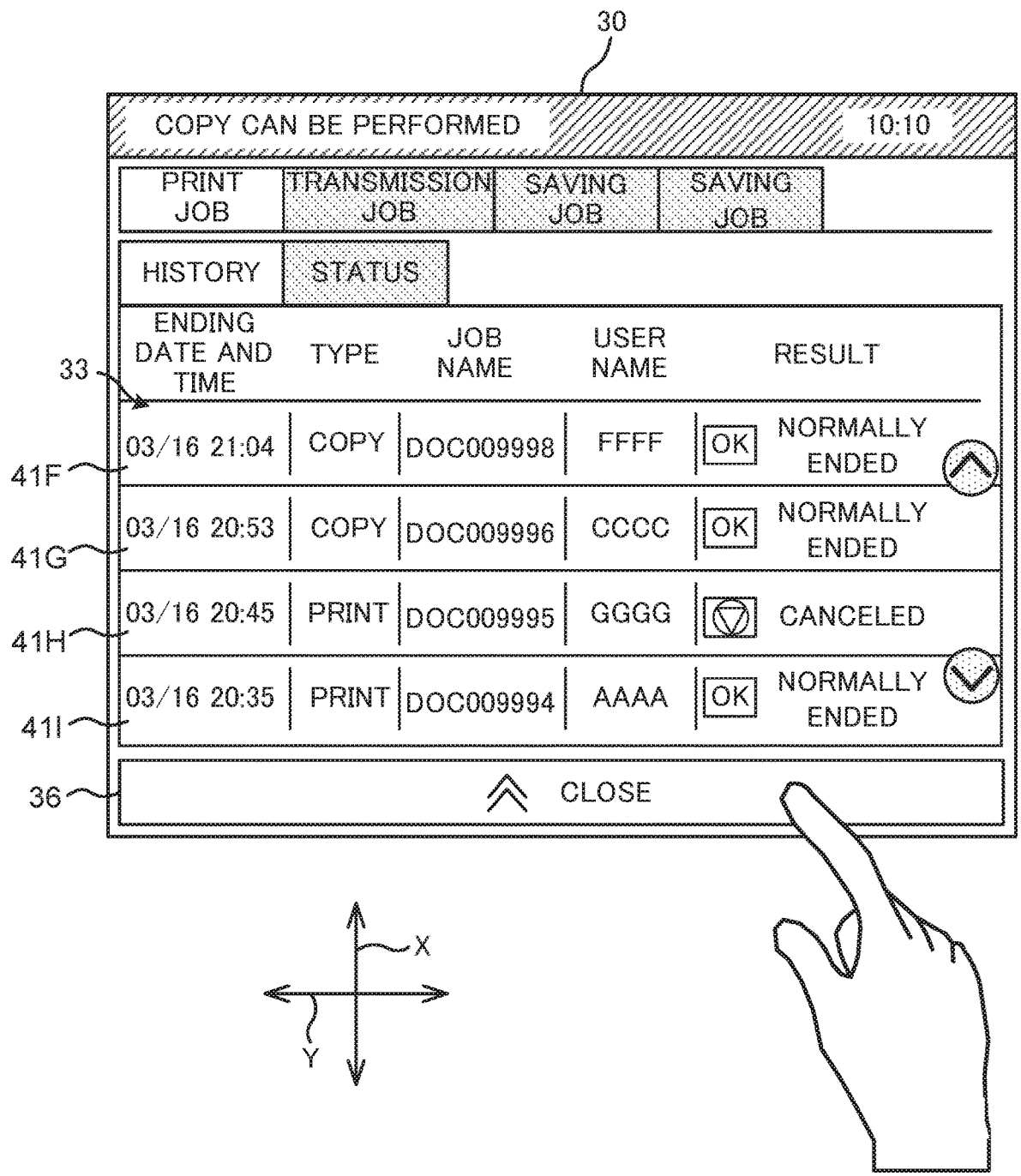
FIG. 6 is a diagram illustrating one example of the confirmation screen provided at a time point at which scroll ends.

FIG. 6 is a diagram illustrating one example of the confirmation screen provided at a time point at which the scroll ends. Referring to FIG. 6, the controller 10 causes the display device 15 to display the display portion including the items 41F to 41I in the region 33 at this point. The controller 10 also causes the display device 15 to display, as a soft key, a key 36 for inputting an instruction for closing the confirmation screen 30. It is assumed that the user has performed touch operation on the key 36 after confirming contents of the item 41I. Upon receiving the touch operation performed on the key 36 via the touch panel 16B, the controller 10 ends the display portion change processing and also causes the display device 15 to end the display of the confirmation screen 30.

Figure 7:
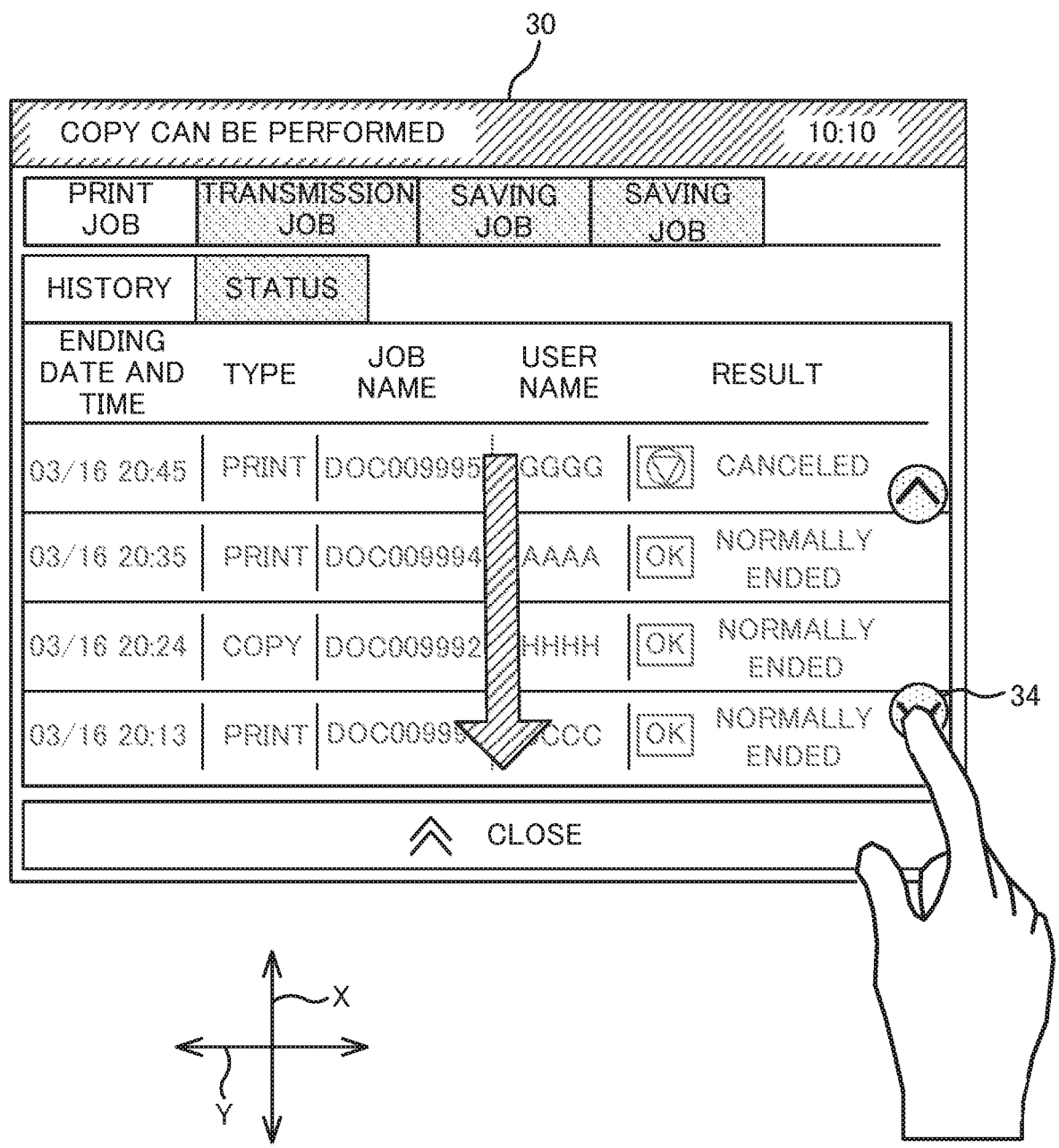
FIG. 7 is a diagram illustrating one example of the confirmation screen provided when touch operation is performed on a forward key.

(2) When the touch operation performed on the forward key 34 has been received before the movement amount of the list image 40 reaches the set scroll amount FIG. 7 is a diagram illustrating one example of the confirmation screen provided when touch operation is performed on the forward key. Referring to FIG. 7, it is assumed that the user has performed the touch operation on the forward key 34 during the scroll of the list image 40 in desire to display not the item 41I but the item 41L in the region 33 through reconsideration after performing the slide operation A1.

In this case, since the list image 40 is being scrolled, the controller 10 determines that the movement amount of the list image 40 has not reached the set scroll amount (NO in step S16). Upon receiving the touch operation performed on the forward key 34 via the touch panel 16B, the controller 10 determines that the touch operation performed on the forward key 34 has been received (YES in step S17) and stands by until determination that the movement amount of the list image 40 has reached the set scroll amount (NO in step S20).

Upon causing the display device 15 to scroll the list image 40 until the display portion including the items 41F to 41I is displayed in the region 33, the controller 10 determines that the movement amount of the list image 40 has reached the set scroll amount (YES in step S20) and adds the additional scroll amount stored in the HDD 17 to the set scroll amount to thereby change the set scroll amount (step S21). In this case, the set scroll amount is a value corresponding to "an amount of movement for the ten items" which is twice the scroll amount before the change.

After changing the setting of the scroll amount, the controller 10 causes the display device 15 to start the inertia scrolling of the list image 40 in the shorter direction X directed toward the first direction at the set scroll speed (step S22). After starting the scroll, the controller 10 returns to the processing in step S16.

It is assumed that, the user has performed neither further touch operation on the forward key 34 nor further touch operation on the return key 35 during the scroll of the list image 40 after performing the touch operation on the forward key 34. Upon causing the display device 15 to scroll the list image 40 until the display portion including the items 41K to 41N is displayed in the region 33, the controller 10 determines that the movement amount of the list image 40 from a time point at which the slide operation was received has reached the set scroll amount (YES in step S16) and ends the scroll of the list image 40 (step S19). After ending the scroll, the controller 10 returns to the processing in step S11.

Figure 8:
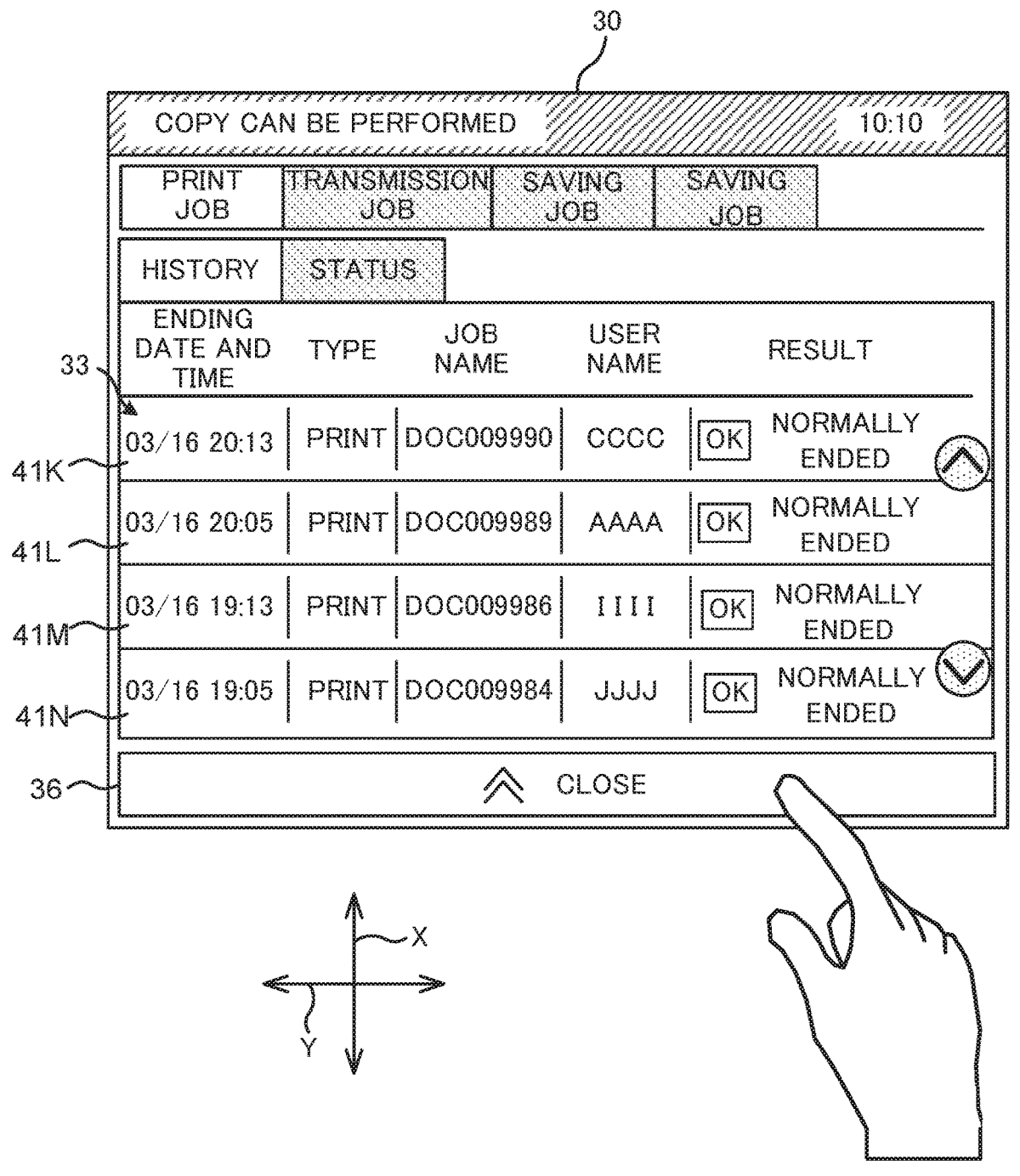

FIG. 8 is a diagram illustrating one example of the confirmation screen provided at the time point at which the scroll ends. Referring to FIG. 8, the controller 10 causes the display device 15 to display the display portion including the items 41K to 41N in the region 33 at this point. It is assumed that the user has performed touch operation on the key 36 after confirming contents of the item 41L. Upon receiving the touch operation performed on the key 36 via the touch panel 16B, the controller 10 ends the display portion change processing and also causes the display device 15 to end the display of the confirmation screen 30.

Figure 9:
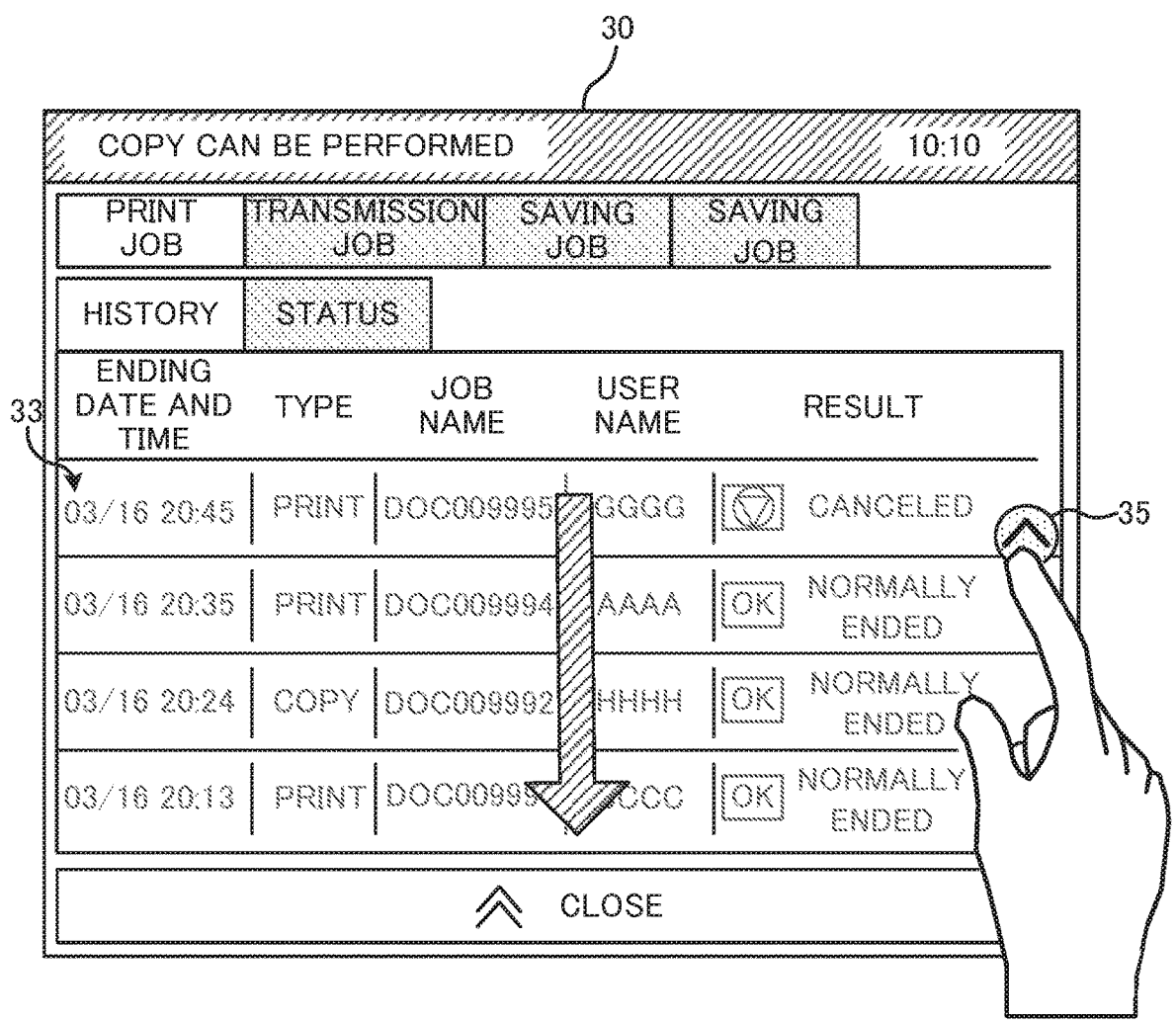
FIG. 9 is a diagram illustrating one example of the confirmation screen provided when touch operation is performed on a return key.

(3) When the touch operation performed on the return key 35 has been received before the movement amount of the list image 40 reaches the set scroll amount FIG. 9 is a diagram illustrating one example of the confirmation screen provided when the touch operation has been performed on the return key. Referring to FIG. 9, it is assumed that the user has performed the touch operation on the return key 35 during the scroll of the list image 40 in desire to display not the item 41I but the item 41A in the region 33 through reconsideration after performing the slide operation A1.

In this case, since the list image 40 is being scrolled, the controller 10 determines that the movement amount of the list image 40 has not reached the set scroll amount (NO in step S16). Upon receiving the touch operation performed on the return key 35 via the touch panel 16B, the controller 10 determines that the touch operation performed on the forward key 34 has not been received (NO in step S17) and also determines that the touch operation performed on the return key 35 has been received (YES in step S18) and stands by until determination that the movement amount of the list image 40 reaches the set scroll amount (NO in step S23).

Upon causing the display device 15 to scroll the list image 40 until the display portion including the items 41F to 41I is displayed in the region 33, the controller 10 determines that the movement amount of the list image 40 has reached the set scroll amount (YES in step S23) and subtracts, from the set scroll amount, the additional scroll amount stored in the HDD 17 to thereby change the set scroll amount (step S24). In this case, the set scroll amount turns to "0".

After changing the setting of the scroll amount, the controller 10 causes the display device 15 to start the inertia scrolling of the list image 40 in the shorter direction X directed toward the second direction at the set scroll speed (step S25). After starting the scroll, the controller 10 returns to the processing in step S16.

It is assumed that the user has performed neither touch operation on the forward key 34 nor additional touch operation on the return key 35 during the scroll of the list image 40 after performing the touch operation on the return key 35. Upon causing the display device 15 to scroll the list image 40 until the display portion including the items 41A to 41D is displayed in the region 33, the controller 10 determines that the movement amount of the list image 40 from the time point at which the slide operation was received has reached the set scroll amount (YES in step S16) and ends the scroll of the list image 40 (step S19). After ending the scroll, the controller 10 returns to the processing in step S11.

Figure 10:
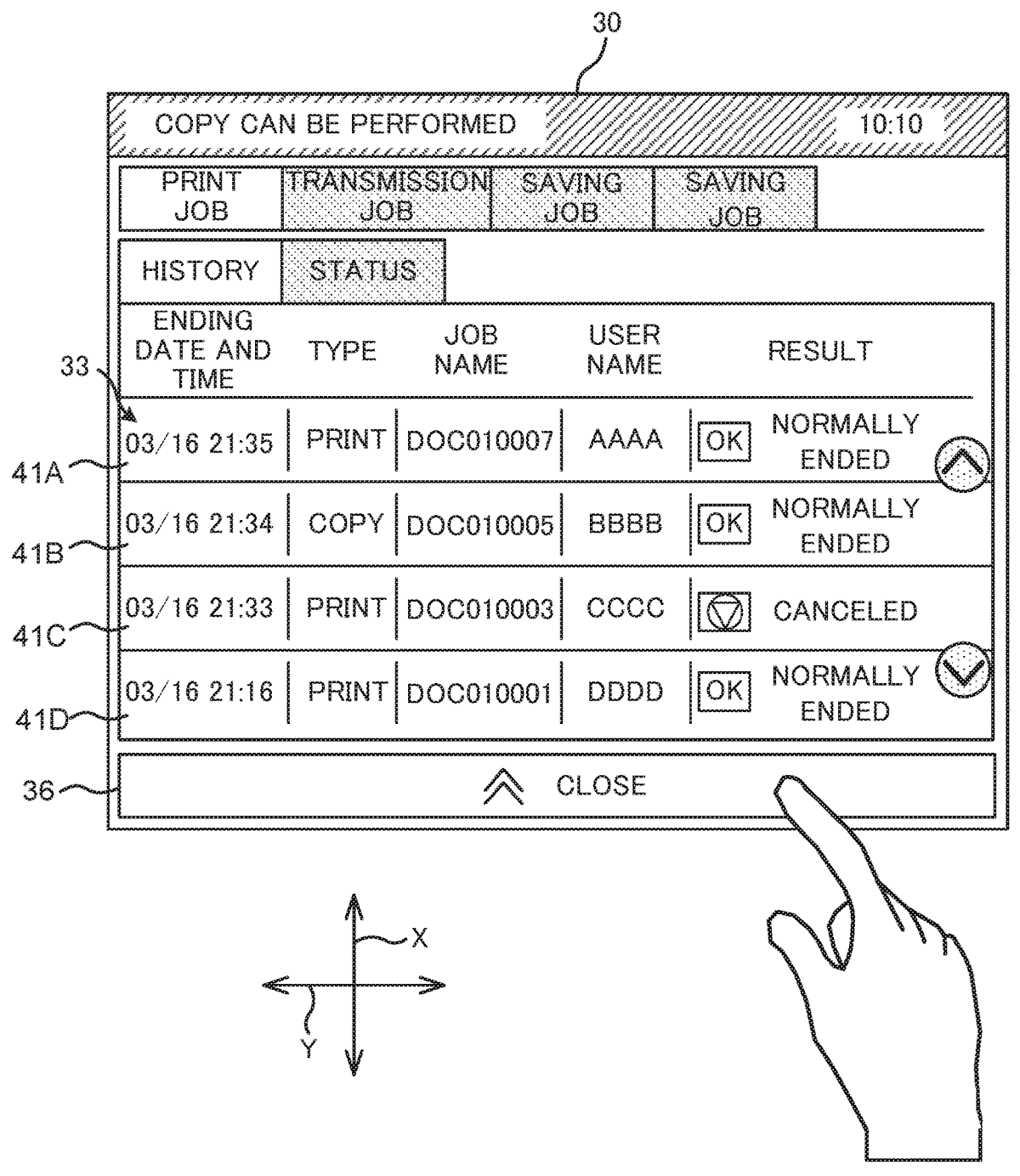

FIG. 10 is a diagram illustrating another example of the confirmation screen provided at the time point at which the scroll ends. Referring to FIG. 10, the controller 10 causes the display device 15 to display, in the region 33, the portion 42 including the items 41A to 41D as the display portion. It is assumed that the user has performed the touch operation on the key 36 after confirming contents of the item 41A. Upon receiving the touch operation performed on the key 36 via the touch panel 16B, the controller 10 ends the display portion change processing and causes the display device 15 to end the display of the confirmation screen 30.

When causing the scroll of the image displayed on the touch panel display, the user who is familiar with gesture operation such as flick operation or swipe operation performs the flick operation or the swipe operation on the image displayed on the touch panel display without performing the touch operation on the return key or the forward key in many cases. In such a case, there arises a problem that the return key or the forward key is not effectively utilized.

As described above, a plurality of operation methods for carrying out the scrolling of the image displayed on the touch panel display are generally known, but these operation methods cannot solve the problem described above.

On the contrary, according to the embodiment described above, upon receiving the touch operation performed on the forward key 34 via the touch panel 16B before the movement amount of the list image 40 from the time point at which the slide operation was received reaches the set scroll amount, the controller 10 adds the additional scroll amount stored in the HDD 17 to the set scroll amount to thereby change the set scroll amount, causing the display device 15 to scroll the list image 40 in the shorter direction X directed toward the first direction until the movement amount of the list image 40 from the time point at which the slide operation was received reaches the scroll amount having been changed.

Consequently, when the list image 40 is subjected to the inertia scrolling in response to the slide operation, the user can touch the forward key 34 to thereby cause the display device 15 to scroll the list image 40 with the same scroll amount as that employed when the aforementioned slide operation is performed again. Therefore, the forward key 34 can be effectively utilized even in an information processor loaded with a touch panel display capable of receiving gesture operation.

Moreover, according to the embodiment described above, upon receiving the touch operation performed on the return key 35 via the touch panel 16B before the movement amount of the list image 40 from the time point at which the slide operation was received reaches the set scroll amount, the controller 10 subtracts the additional scroll amount stored in the HDD 17 from the set scroll amount to thereby change the set scroll amount, causing the display device 15 to scroll the list image 40 in the shorter direction X toward the second direction until the movement amount of the list image 40 from the time point at which the slide operation was received reaches the scroll amount having been changed.

Consequently, the user can touch the return key 35 when the list image 40 is subjected to the inertia scrolling in response to the slide operation, thereby causing the display device 15 to scroll the list image 40 with the same scroll amount as that employed when the aforementioned slide operation with only the direction reversed is performed again. Therefore, the return key 35 can also be effectively utilized in the information processor loaded with the touch panel display capable of receiving the gesture operation.

Moreover, according to the embodiment described above, the controller 10 causes the display device 15 to scroll the list image 40 at the scroll speed set in accordance with the attribute of the slide operation.

Consequently, the user can touch the forward key 34 or the return key 35 when the list image 40 is subjected to the inertia scrolling in response to the slide operation, thereby causing the scroll of the list image 40 with the same scroll amount and at the same scroll speed as those employed when the aforementioned slide operation is performed again or with the same scroll amount and at the same scroll speed as those employed when the aforementioned slide operation with only the direction reversed is performed again. Therefore, the user convenience can be further improved.

First Modified Example

In the embodiment described above, the controller 10 causes the display device 15 to display the forward key 34 and the return key 35 in "blue" as the first display color, but this disclosure is not limited to such an embodiment. For example, the controller 10 may cause the display device 15 to display the forward key 34 and the return key 35 in the first display color when not causing the display device 15 to scroll the list image 40, and the controller 10 may display the forward key 34 and the return key 35 in "red" as a second display color different from the first color when causing the display device 15 to scroll the list image 40.

Consequently, the user can easily recognize a function change corresponding to the forward key 34 or the return key 35. Note that the first display color is not limited to the "blue" and the second display color is not limited to the "red". For example, "green" may be used as the first display color and "yellow" may be used as the second display color.

Another Modified Example

In the embodiment described above, upon the slide operation performed on the image displayed at the display device 15 by the user, the touch panel 16B detects the first position at which the finger of the user makes first contact with the screen of the display device 15 and the second position at which the finger of the user separates from the screen of the display device 15, but this disclosure is not limited to such an embodiment. For example, the touch panel 16B may be configured to detect a first position at which the finger of the user starts its movement and a second position at which the finger of the user stops its movement.

Moreover, in the embodiment described above, upon receiving the touch operation performed on the forward key 34 via the touch panel 16B, the controller 10 causes the display device 15 to display the forward image portion in the region 33 but this disclosure is not limited to such an embodiment. For example, the controller 10 may be configured to, upon receiving the touch operation performed on the forward key 34 via the touch panel 16B, cause the display device 15 to scroll the list image 40 until the feed image portion is displayed, Moreover, in the embodiment described above, upon receiving the touch operation performed on the return key 35 via the touch panel 16B when not causing the scroll of the list image 40, the controller 10 causes the display device 15 to display the return image portion in the region 33 but this disclosure is not limited to such an embodiment. For example the controller 10 may be configured to, upon receiving the touch operation performed on the return key 35 via the touch panel 16B, cause the display device 15 to scroll the list image 40 until the return image portion is displayed.

Moreover, in the first modified example described above, the controller 10 causes the display device 15 to display the forward key 34 and the return key 35 in the first display color when not causing the display device 15 to scroll the list image 40, whereas the controller 10 causes the display device 15 to display the forward key 34 and the return key 35 in the second display color when causing the display device 15 to scroll the list image 40, although this disclosure is not limited to such an embodiment.

Specifically, the controller 10 may be configured to provide different display modes of the forward key 34 and the return key 35 between when not causing the scroll of the list image 40 and when causing the scroll of the list image 40. For example, the controller 10 may cause the display device 15 to display the forward key 34 and the return key 35 in a predefined first size when not causing the scroll of the list image 40 and may cause the display device 15 to display the forward key 34 and the return key 35 in a predefined second size larger or smaller than the first size by a predefined amount when causing the scroll of the list image 40.

This disclosure is not limited to the configuration of the embodiments described above and various modifications thereto are permitted. For example, the color multifunction peripheral is used as the information processor according to this disclosure in the embodiments described above, but this is just one example and a monochromatic multifunction peripheral, a printer, a copier, or a facsimile device may be used as the information processor.

Moreover, the aforementioned configuration and processing illustrated in the embodiment described above with reference to FIGS. 1 to 10 form just one embodiment of this disclosure and this disclosure is not limited to the aforementioned configuration and processing.

While the present disclosure has been described in detail with reference to the embodiments thereof, it would be apparent to those skilled in the art the various changes and modifications may be made therein within the scope defined by the appended claims.

What is claimed is:

1. An information processor comprising:
   a display device;
   a touch panel;
   a storage device; and
   a control device including a processor, and as a result of execution of a control program by the processor, functioning as a controller
   causing the display device to display, in a predefined region, a portion in a predefined direction of a predefined image as a display portion and also to display:
   a forward key configured to input an instruction for displaying, in the predefined region, a forward image portion being located on a side of a first direction directed more closely to one end side of the predefined direction than the display portion and continuing to the display portion in the predefined image; and a return key configured to input an instruction for displaying, in the predefined region, a return image portion being located on a side of a second direction directed more closely to another end side of the predefined direction than the display portion and continuing to the display portion in the predefined image,
   upon receiving a touch operation performed on the forward key via the touch panel when not carrying out a inertia scrolling of the predefined image, causing the display device to display, in the predefined region, the forward image portion as the display portion,
   upon receiving a slide operation performed on the display portion via the touch panel, setting, as a scroll amount, a value acquired by multiplying a distance of the slide operation by a predefined coefficient, causing the display device to carry out the inertia scrolling the predefined image in the predefined direction toward a direction of the slide operation until a movement amount of the predefined image from a time point at which the slide operation was received reaches the set scroll amount and causing the storage device to store the set scroll amount as an additional scroll amount, and
   upon receiving the touch operation performed on the forward key via the touch panel when carrying out the inertia scrolling of the predefined image, adding the additional scroll amount to the set scroll amount to change the set scroll amount and causing the display device to carry out the inertia scrolling the predefined image in the predefined direction toward the first direction until the movement amount of the predefined image from the time point at which the slide operation was received reaches the scroll amount having been changed.

2. The information processor according to claim 1, wherein
   upon receiving a touch operation performed on the return key via the touch panel when not carrying out the inertia scrolling of the predefined image, the controller causes the display device to display, in the predefined region, the return image portion as the display portion,
   upon receiving the touch operation performed on the return key via the touch panel when carrying out the inertia scrolling of the predefined image, the controller subtracts the additional scroll amount from the set scroll amount to change the set scroll amount and causes the display device to carry out the inertia scrolling the predefined image in the predefined direction toward the second direction until the movement amount of the predefined image from the time point at which the slide operation was received reaches the scroll amount having been changed.

3. The information processor according to claim 1, wherein
   the controller causes the display device to carry out the inertia scrolling the predefined image at scroll speed set in accordance with the attribute of the slide operation.

4. The information processor according to claim 1, wherein
   the controller
   causes the display device to display the forward key and the return key in a predefined first display mode when not causing the display device to carry out the inertia scrolling the predefined image, and
   causes the display device to display the forward key and the return key in a second display mode different from the first display mode when causing the display device to carry out the inertia scrolling the predefined image.

5. The information processor according to claim 4, wherein
   the controller
   causes the display device to display the forward key and the return key in a predefined first color when not causing the display device to carry out the inertia scrolling the predefined image, and
   causes the display device to display the forward key and the return key in a second color different from the first color when causing the display device to carry out the inertia scrolling the predefined image.

6. The information processor according to claim 4, wherein
   the controller
   causes the display device to display the forward key and the return key with a predefined first size when not causing the display device to carry out the inertia scrolling the predefined image, and
   causes the display device to display the forward key and the return key with a second size different from the first size when causing the display device to carry out the inertia scrolling the predefined image.

* * * * *